May 27, 1941.   G. E. FORD   2,243,733
THERMOMETER CONSTRUCTION
Filed Dec. 12, 1938   2 Sheets-Sheet 1
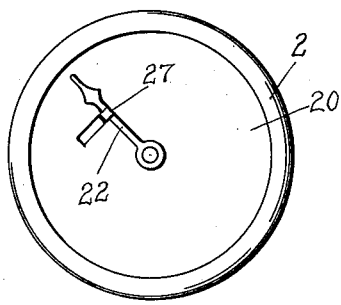
FIG 1
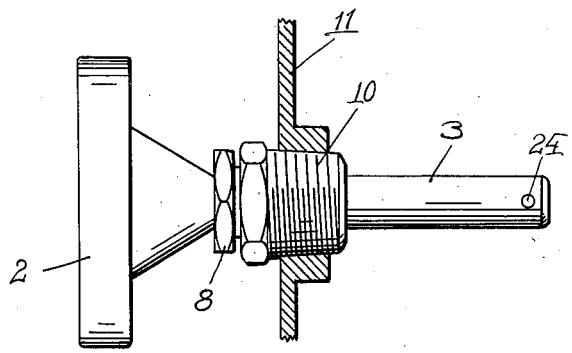
FIG 2
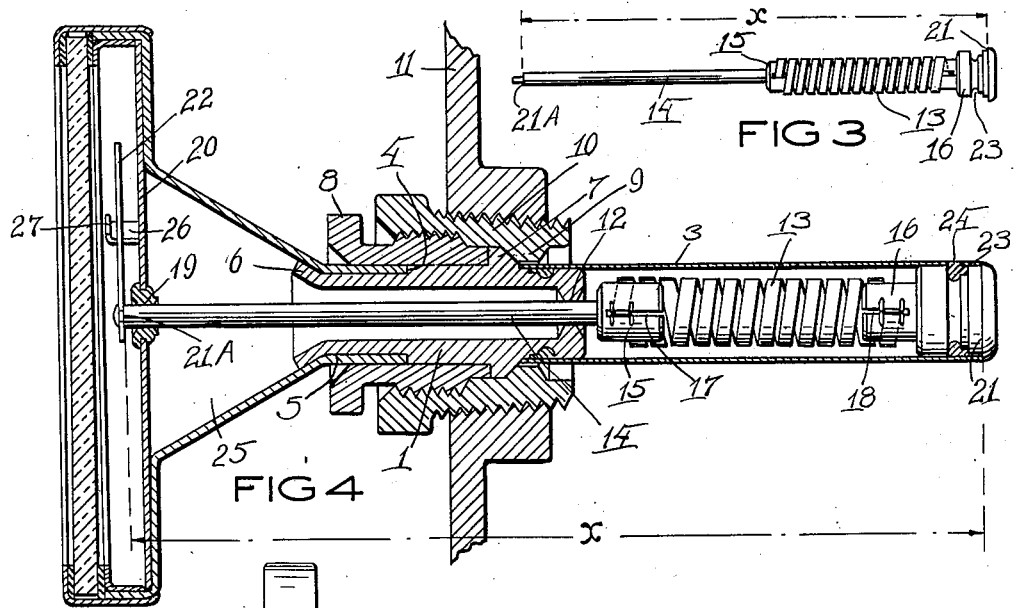
FIG 3
FIG 4
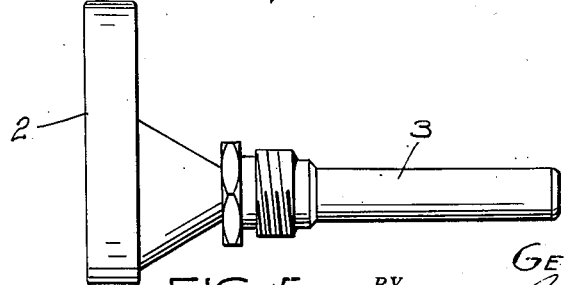
FIG 5
INVENTOR
GEORGE E. FORD
BY
ATTORNEY May 27, 1941.　　　G. E. FORD　　　2,243,733
THERMOMETER CONSTRUCTION
Filed Dec. 12, 1938　　　2 Sheets-Sheet 2

INVENTOR
GEORGE E. FORD
BY
ATTORNEY

Patented May 27, 1941

2,243,733

UNITED STATES PATENT OFFICE 2,243,733

THERMOMETER CONSTRUCTION

George E. Ford, Rochester, N. Y., assignor to Rochester Manufacturing Company, Rochester, N. Y., a corporation of New York Application December 12, 1938, Serial No. 245,158

7 Claims. (Cl. 73—367)

This invention relates to thermometers and more particularly to the construction of thermometers in which the thermo-responsive element comprises a bimetallic helical coil and the principal object of the invention is to provide a novel inexpensive construction for such a thermometer in which the thermo-responsive element, its anchoring member and movement transmitting and indicator stem are separately assembled into a unit having a predetermined overall length for proper operation in the thermometer assembly.

Another object of this invention is to provide an extremely rugged construction for a metallic thermometer so that its accurate operation will not be affected by vibration.

Another object of this invention is to provide a thermometer with a novel dial case and mounting therefor.

A further object of the invention is to provide a novel thermometer construction in which the bearing sleeve for the pointer stem provides the support for the dial housing at one end and the support for the thermoresponsive unit at the other end thereof.

Another purpose of the invention is to effect a novel adjustable mounting for a thermometer.

A still further object of the invention is to provide the protective cover for the thermoresponsive element of the thermometer with a novel sealing member which serves to support one end of the thermoresponsive element in a predetermined position in the protective cover.

All these and other objects and attendant advantages of the invention will become more readily apparent from the detailed description thereof which follows, reference being had to the accompanying drawings, in which Figure 1 is a front elevation of the thermometer embodying my invention.

Figure 2 is a side elevation thereof.

Figure 3 is a detail side elevation of the thermo responsive unit embodied in the thermometer.

Figure 4 is an enlarged longitudinal sectional view of the thermometer.

Figure 5 is a side elevation of the thermometer with a modified form of dial case.

Figure 6:
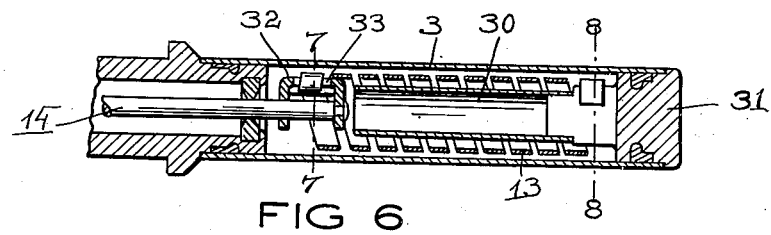
Figure 6 is a longitudinal sectional view of a slightly modified form of the thermo responsive unit and its mounting.
Figure 7:
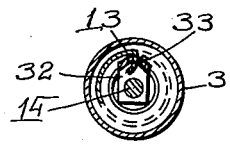
Figure 7 is a vertical sectional view taken on the line 7—7 of Figure 6.

As illustrated in the several figures of the drawings the thermometer construction, forming the subject matter of my present invention, comprises a sleeve member 1 which carries at one end the dial case or housing 2 and at the other end the protector tube 3. For the purpose of mounting the dial case on the sleeve member 1, the end of the sleeve member is reduced in diameter so as to provide the shoulder 4 thereon and have the tubular extension 5 of the dial case telescope over the reduced portion of the sleeve against this shoulder. By enlarging the outer end of the sleeve member within the dial case, as illustrated at 6 in Figure 4, the dial case is then fixedly held and locked to the sleeve member 1.

On the sleeve member is provided an annular seat 7 and surrounding the sleeve member between this seat and the rear of the dial casing so as to be rotatable thereon is the nut 8 with which the seat 7 is forced against a seat 9 provided in the pipe plug 10 when the nut 8 is threaded into this plug. The thermometer is thus sealed into the pipe plug and locked therein to provide for the mounting of the thermometer in a wall 11 in a manner which permits rotatable adjustment of the thermometer relative thereto.

A protecting and supporting tube 3 is telescoped over the end of the sleeve member 1 adjacent the annular seat 7 and provides an extension thereof for the support and protection of the thermoresponsive element within it. This element comprises a helical coil 13 made of a suitable bi-metallic ribbon and forms part of the unit which includes the pointer stem 14, the enlarged connecting end 15 thereof and the anchoring plug 16. The enlarged connecting end of the pointer stem is provided with a cross slit 17 in which the end of the helical coil is held. The enlarged connecting end of the pointer stem is slightly smaller in diameter than the inside of the coil 13 in order to facilitate the centering of the coil on the stem and provides maximum bearing for the coil end in the cross slit 17. The other end of the coil is similarly held in place in a cross slit 18 provided in the anchoring plug 16 so that the coil is held properly centered but otherwise freely suspended between the pointer stem and the anchoring plug.

Because of the practically unavoidable difference in the spacing of the individual coils in the winding of helical coils wound from uniform lengths of bi-metallic ribbon, the mounting of these helical coils must be such that the difference in their overall length must be compensated for. In my invention the helical coil with the pointer stem on one end and the anchoring plug at the other end are therefore assembled into a unit and adjusted relative to one another to give this unit a predetermined overall length so that the unit need only be mounted in a predetermined position relative to the thermometer dial to have the helical coil properly operate in the thermometer no matter to what length the helical coil may have been wound from the bi-metallic ribbon.

In the assembly of the bi-metallic coil to the pointer stem and the anchoring plug, the diametrically bent ends of the coil are inserted into the cross slits of these connecting ends of the pointer stem and the anchoring plug for a preliminary assembly of these three members. The unit thus formed is then placed on a fixture in which these assembled members are held in line with one another. The overall length "X" of these members from the shoulder 21 on the anchoring plug to the shoulder 21A of the pointer stem is then measured and by a longitudinal adjustment of the ends of the coil ends in the cross slits brought to a predetermined length so that the pointer which is fastened to the pointer stem will be located intermediate the dial and crystal in the dial housing to permit an axial movement of the pointer on the longitudinal contraction and expansion of the coil as the coil turns in response to a change in temperature. After the ends of the coils have been adjusted in the cross slits for the proper length of the unit they are staked to the connecting end of the pointer stem and the anchoring plug by upsetting the metal across the slits so as to hold these ends fixedly in place in their adjusted position.

In the construction of thermometers of this type the mounting of the thermoresponsive element to the pointer stem and its fixed anchoring member has heretofore been necessary during the assembly of the thermometer so that any adjustment of these members relative to each other and to other members of the thermometer had to be made during the assembly of all of the members of the thermometer.

In the present invention this has been eliminated and thus greatly simplifies the assembly and the accuracy with which the members are brought together as above pointed out. The helical thermoresponsive coil with the pointer stem at one end and the anchoring plug at the other end is telescoped into the rear of the protecting and supporting tube so that the pointer stem will pass thru the bearing 12 in the sleeve member and project from the bearing 19 in the dial 20. The shoulder 21 on the anchoring plug 16 is adapted to rest against the outer edge of the supporting tube and locate the thermoresponsive unit in its proper endwise position within the protecting tube and sleeve member so that the pointer 22 when attached to the pointer stem is properly located in the dial housing in front of the dial 20 as above pointed out. For the radial adjustment of the pointer the supporting tube 3 is turned to rotate the thermoresponsive unit with it and locate the pointer attached thereto to its proper indicating position over the dial. The pointer stem is thus journaled at one end in the dial and at the other end in the end of the sleeve member 1 so that substantially the full length of the pointer stem is pivotally supported for accurate alignment and resulting sensitive movement by the bi-metallic coil.

With the pointer in the position from which the thermoresponsive coil will operate it to accurately indicate variations in the temperature surrounding the protecting tube 3, the anchoring plug 16 is fastened into the end of the tube 3 to seal it and at the same time fixedly anchor the plug in its properly adjusted position. For this purpose the anchoring plug is provided with an annular groove 23 which is located thereon so as to register with the opening 24 in the wall near the outer end of the protecting tube 3. Suitable soldering flux is allowed to flow into the opening 24 to fill the annular groove 23 within the tube to completely seal the anchoring plug into the end of the tube and at the same time hold the plug permanently positioned in its adjusted position. Similar sealing and fastening means in which soldering flux is allowed to flow thru an opening in the wall of the tube into an annular groove, are provided between the tube and sleeve member as illustrated in section in Figure 4.

The tubular extension 5 at the rear of the case 2 gradually enlarges into a spacing chamber which spaces the case proper from the sleeve member. This conical spacing chamber may be either concentric to the dial casing, as illustrated in Figures 2 and 4, or may be eccentric thereto as illustrated in Figure 5. The latter form is preferred when it is desired to offset the dial from the pointer stem for the purpose of locating the dial in a predetermined position.

The dial is provided with a stop 26 to have the pointer 22 rest thereagainst in its starting position. This stop is provided at its outer end with a flange 27 so as to overhang the pointer and prevent the endwise expansion of the bi-metallic coil from disengaging the pointer from the pointer rest.

Figure 9:
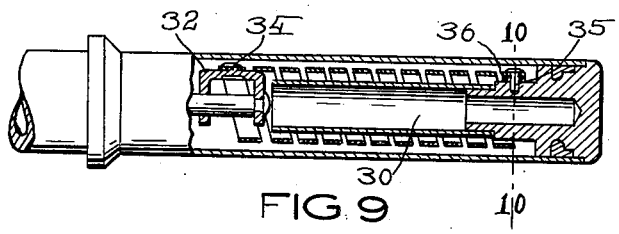
Figure 9 is a longitudinal sectional view of another slightly modified form of the thermo-responsive unit and its mounting.

In Figures 6 and 9 I have shown the thermoresponsive unit with a conduction tube 30. This conduction tube is carried by the end plug 31 so as to conduct heat from the plug to the inside of the helical coil 13. In this way the protector tube 3 will radiate heat to the outside of the helical bi-metallic coil the full length thereof and the conduction tube 30 will radiate heat to the inside of the coil and thus increase the accuracy of the thermometer by reducing the amount of lag in the movement of the helical coil by the heat of the fluid which surrounds the protector tube.

Figure 8:
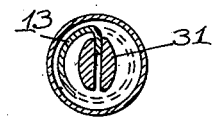
Figure 8 is a vertical sectional view taken on the line 8—8 of Figure 6.

In order to eliminate friction between the ends of the helical spring and the points of attachment thereof or reduce such friction to a minimum, the pointer stem may be provided with the connecting bracket 32. This bracket is substantially U shaped and has a slot 33 therein thru which the end of the helical coil projects for suitable and adjustable attachment to the bracket. The line contact between the end of the helical coil and the bracket thus reduces the frictional contact between these elements to a minimum. To eliminate frictional contact between the helical spring and the end plug 31, the slotted portion of this plug to which the helical coil is attached is substantially elliptical in cross section as illustrated in Figure 8.

When the conduction tube 30 is telescoped over the slotted portion of the end plug it draws the sides thereof together and clamps the end of the helical coil in place in the slot.

Figure 10:
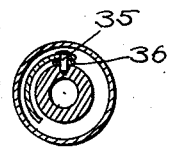
Figure 10 is a vertical sectional view taken on the line 10—10 of Figure 9.

In Figures 9 and 10 I have illustrated the attachment of the ends of the helical coil by riveting. For this purpose the bracket 32 is provided with a suitable anchoring lug 34 for engagement by one end of the helical spring. The opposite end of the helical spring is attached to the end plug 31 by the rivet 35 with a spacing washer 36 interposed between the spring and the plug to prevent frictional contact between the coil and the plug.

From the foregoing it will be apparent that I have devised a new and useful construction for thermometers which embodies the features enumerated as desirable in the statement of the invention and the above description, and while I have, in the present instance, shown and described preferred embodiments thereof which make the thermometer accurate and reliable in its operation, it is to be understood that these embodiments are susceptible of modification without departing from the spirit or scope of the invention or sacrificing any of its advantages.

I claim:

1. In a thermometer construction having a bearing sleeve, the combination of an open ended tube forming an extension of said sleeve and having a hole in the wall near the outer end thereof, a pointer stem rotatably mounted in said bearing sleeve, a helical bi-metallic coil attached to said stem with one end thereof, a supporting and anchoring plug attached to the other end of said coil and telescopingly mounted in the open end of said tube, said plug having an annular groove in the periphery thereof in register with the hole in said tube to provide for the flowing of solder flux into the groove and provide a combined seal and lock for the plug in said tube.

2. In a thermometer construction the combination of a bearing sleeve, an open ended tube telescopingly engaging said bearing sleeve so as to form an extension on said sleeve, said extension having a hole in the wall near each end thereof, a pointer stem rotatably mounted in said bearing sleeve, a helical bi-metallic coil attached to said stem with one end thereof, a supporting and anchoring plug attached to the other end of said coil and telescopingly mounted in the open end of said tube, said plug having an annular groove in the periphery thereof in register with one hole in said tube to provide for the flowing of solder flux into the groove to seal the plug into the tube and hold the plug locked in place therein, said bearing sleeve having an annular groove in the periphery thereof in register with the other hole in said tube to provide for the flowing of solder flux into the groove in said bearing sleeve and provide a combined seal and lock for said tube on said bearing sleeve.

3. In a thermometer adapted for mounting in a threaded opening of a wall having an annular seat in said opening, the combination of a sheet metal case, a spacing chamber of reduced diameter at the rear of said case, a sleeve telescopingly engaging into said spacing chamber, said sleeve having a bendable wall flared into said spacing chamber for anchorage thereto and having a reduced opening forming a bearing spaced from said spacing chamber, an annular seat surrounding said sleeve, a bushing rotatable on said sleeve between the annular seat of said sleeve and said spacing chamber for threaded engagement into the opening of said wall and rotative adjustment of the annular seat of said sleeve against the annular sleeve in said wall, a tubular member closed at its outer end forming a continuation of said sleeve, a thermo-responsive member anchored in said tubular member, an indicator stem journaled in said bearing of said sleeve and connected to said thermo-responsive member and an indicator carried by said indicator stem and held for movement in said case.

4. In a thermometer adapted for mounting in a threaded opening of a wall having an annular seat in said opening, the combination of a sheet metal case, a spacing chamber of reduced diameter at the rear of said case, a sleeve telescopingly engaging said spacing chamber and having a reduced opening forming a bearing spaced from said spacing chamber, an annular seat surrounding said sleeve, a bushing rotatable on said sleeve between said annular seat of said sleeve and said spacing chamber for threaded engagement into the opening of said wall and rotative adjustment of the annular seat of said sleeve against the annular sleeve in said wall, a tubular member closed at its outer end forming a continuation of said sleeve, a thermo-responsive member anchored in said tubular member, an indicator stem journaled in said bearing of said sleeve and connected to said thermo-responsive member, and an indicator carried by said indicator stem and held for movement in said case.

5. In a thermometer the combination as set forth in claim 4 in which said tubular member is closed at its outer end by a cylindrical plug to provide an initial rotatable anchorage in said tubular member with said thermo-responsive member held anchored to said plug for adjustment of said thermo-responsive member within said tubular member and predetermined setting of said indicator in said housing.

6. In a thermometer construction adapted for adjustable mounting in the threaded opening of a wall having a seat therein, the combination of a dial housing, a spacing chamber extending rearwardly of said dial housing, tubular means extending rearwardly of said spacing chamber, an annular seat surrounding said tubular means spaced from said spacing chamber, a clamping bushing threaded on the outside and freely rotatable on said tubular means between said spacing chamber and said annular seat for engagement into the opening of the wall and clamping movement of said annular seat against the seat in said wall with rotative adjustment of said dial housing on said wall, a thermoresponsive element sealed within said tubular means, indicating means in said dial housing connected with said thermoresponsive element and supporting means at the end of said thermoresponsive element for telescopic engagement into said tubular means and initial rotative adjustment of said element in said tubular means and for initial rotative adjustment of said indicating means in said dial housing.

7. In a thermometer construction adapted for mounting in the threaded opening of a wall having a seat therein, the combination of a dial housing, fixed tubular means extending rearwardly of said dial housing, an annular seat surrounding said tubular means spaced from said housing, a thermo-responsive coil within said tubular means, indicating means operated within said housing by said thermo-responsive coil, an anchoring plug for initial rotative adjustment and final anchorage of said thermo-responsive member within said tubular means, and clamping means rotatable on the outside of said tubular means between said annular seat and said housing for engagement into the opening of the wall and rotative adjustment of said housing and anchorage of said tubular means in the opening of said wall.

GEORGE E. FORD.